United States Patent
Chen et al.

(10) Patent No.: US 11,780,144 B2
(45) Date of Patent: Oct. 10, 2023

(54) EXTRUDER SYSTEM

(71) Applicant: The Goodyear Tire & Rubber Company, Akron, OH (US)

(72) Inventors: Hongbing Chen, Broadview Heights, OH (US); Christopher David Dyrlund, Canton, OH (US); Joshua Aaron Phillipson, Brecksville, OH (US); Jared Allen Vanasdale, Boardman, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 266 days.

(21) Appl. No.: 17/205,738

(22) Filed: Mar. 18, 2021

(65) Prior Publication Data

US 2021/0206044 A1    Jul. 8, 2021

Related U.S. Application Data (62) Division of application No. 15/844,875, filed on Dec. 18, 2017, now abandoned.

(51) Int. Cl.
*B29C 48/29* (2019.01)
*B29C 48/25* (2019.01)
(Continued)

(52) U.S. Cl.
CPC ........ *B29C 48/2567* (2019.02); *B29C 48/265* (2019.02); *B29C 48/2888* (2019.02); *B29C 48/397* (2019.02); *B29C 48/501* (2019.02); *B29C 48/655* (2019.02); *B29C 48/68* (2019.02); *B29C 48/686* (2019.02); *B29C 48/725* (2019.02); *B29C 48/92* (2019.02);
(Continued)

(58) Field of Classification Search
CPC . B29C 48/2888; B29C 48/655; B29C 48/397; B29C 48/686; B29C 48/2567
USPC .......................................................... 366/81
See application file for complete search history.

(56) References Cited

U.S. PATENT DOCUMENTS

| | | |
|---|---|---|
| 2,178,955 A | 11/1939 | Draemann |
| 2,807,832 A | 10/1957 | Davis |

(Continued)

FOREIGN PATENT DOCUMENTS

| | | |
|---|---|---|
| CN | 201505996 U | 6/2010 |
| CN | 204036795 U | 12/2014 |

(Continued)

*Primary Examiner* — Marc C Howell
(74) *Attorney, Agent, or Firm* — Katherine A. Smith (57) ABSTRACT

An improved extruder apparatus is disclosed and which includes a cylindrical barrel having a feed end and a discharge end, the feed end having an inlet in fluid communication with a hopper. The extruder screw is mounted in the cylindrical barrel, and the screw has an outer surface having one or more helical flights mounted thereon, wherein the inlet end of the cylindrical barrel has a support frame mounted thereto, wherein an upper surface of the support frame is connected to a throat of a hopper, wherein an insert is mounted to the support frame and has a lower end which extends down into the cylindrical barrel, wherein the insert has an internal passageway having a first opening on the lower end and a second opening upstream of the screw for relieving the pressure.

7 Claims, 8 Drawing Sheets

(51) Int. Cl.
*B29C 48/685* (2019.01)
*B29C 48/285* (2019.01)
*B29C 48/50* (2019.01)
*B29C 48/72* (2019.01)
*B29C 48/395* (2019.01)
*B29C 48/655* (2019.01)
*B29C 48/265* (2019.01)
*B29C 48/68* (2019.01)
B29C 48/92 (2019.01)

(52) U.S. Cl.
CPC ........... *B29C 2948/92514* (2019.02); *B29C 2948/92876* (2019.02)

(56) References Cited

U.S. PATENT DOCUMENTS

| | | |
|---|---|---|
| 3,005,598 A | 10/1961 | Varn |
| 3,632,255 A | 1/1972 | Geyer |
| 3,745,200 A | 7/1973 | Geyer |
| 4,642,040 A | 2/1987 | Fox |
| 4,863,366 A * | 9/1989 | Kim ................. B29C 48/38 264/211.21 |
| 5,909,958 A | 6/1999 | Rauwendaal |
| 2014/0119153 A1 | 5/2014 | Ripple et al. |
| 2019/0184620 A1 | 6/2019 | Chen et al. |

FOREIGN PATENT DOCUMENTS

| | | |
|---|---|---|
| CN | 204036796 U | 12/2014 |
| CN | 204451172 U | 7/2015 |
| DE | 2051568 A1 | 4/1972 |
| JP | 57072837 A | 5/1982 |

\* cited by examiner

EXTRUDER SYSTEM

FIELD OF THE INVENTION

The invention relates in general to extruders for rubber processing, and more particularly to an improved feed system for an extruder screw.

BACKGROUND OF THE INVENTION

Figure 1:
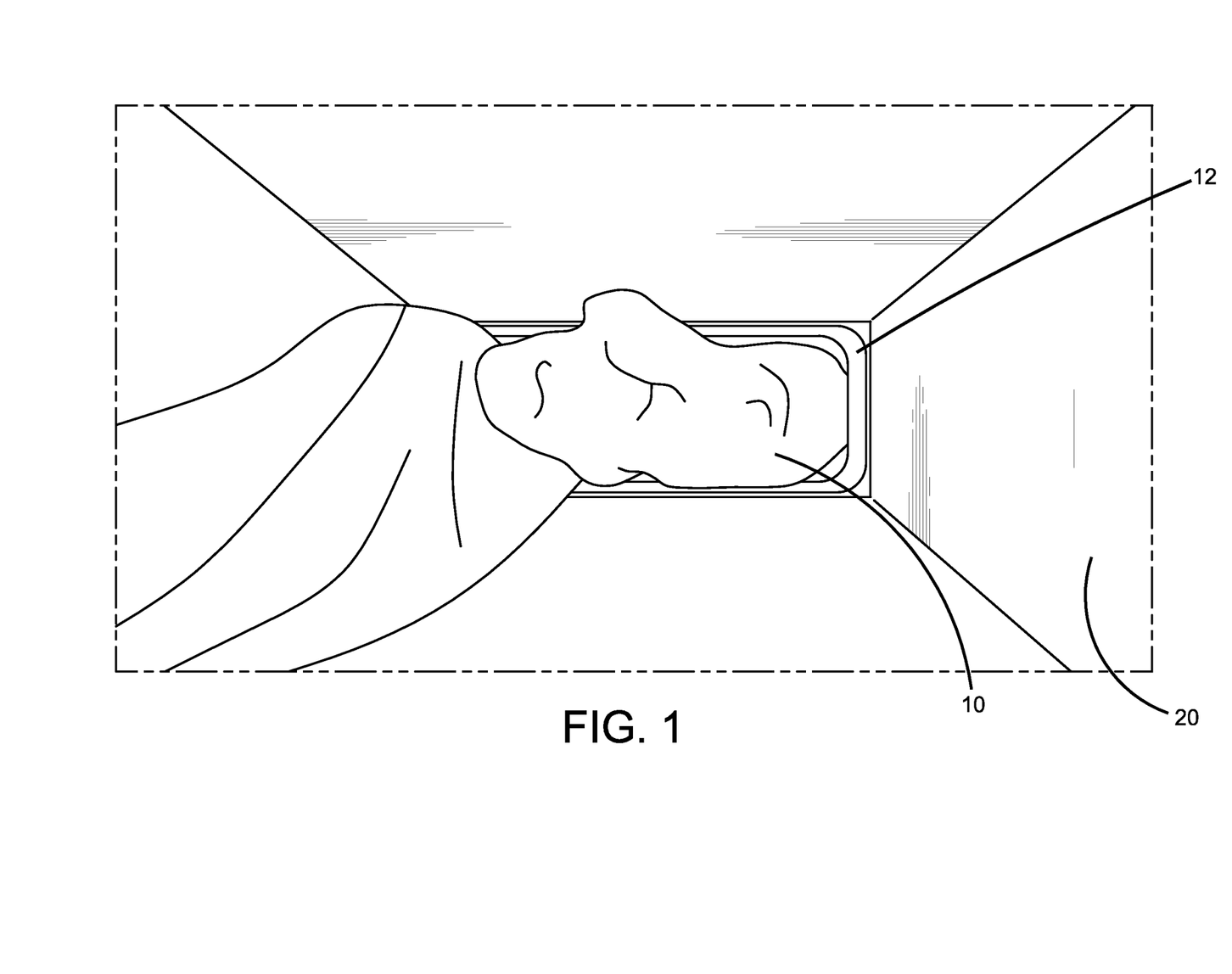
FIG. 1 is a schematic view of a hopper and screw system, as viewed looking down into the hopper, towards the screw.

It is known in the art to extrude visco-elastic materials such as rubber, using a screw extruder. It is known in the art to utilize a feedbox to feed rubber slab compound into the extruder. the rubber slab or stock is typically fed into the hopper at room temperature. As shown in FIG. 1, a ball of rubber 10 is typically formed at the throat 12 of the hopper 20 at the entrance to the extruder screw. The ball of rubber 20 is significantly warmer than the feed stock, and tends to contact the feed strip causing a break or "bite off". The feed strip may also bite off or break due to strip feed tension. This typically occurs when low strength compounds are utilized, particularly tread compounds. The problem is worsened by the "scissor" action on the screw flights against the feed roll and feedbox. If the feed strip breaks, it will result in workers having to clean out the feed box. Thus, it is desired to have an improved extruder screw and feed system that overcomes the slab bite off problem.

SUMMARY OF THE INVENTION

An extruder apparatus of the present invention includes a cylindrical barrel having an inlet end and an outlet end and an extruder screw mounted in the cylindrical barrel. The screw has an outer surface having one or more helical flights mounted thereon. The inlet end of the cylindrical barrel has a support frame mounted thereto, wherein an upper surface of the support frame is connected to a throat of a hopper. An insert is mounted to the support frame and has a lower end which extends down into the cylindrical barrel, wherein the insert has an internal passageway having a first opening on the lower end and a second opening.

The invention provides in a second aspect a extruder apparatus comprising: a cylindrical barrel having an inlet end and an outlet end, an extruder screw mounted in the cylindrical barrel; the screw has an outer surface having one or more helical flights mounted thereon, wherein the inlet end of the cylindrical barrel is connected to a throat of a hopper, wherein one or more pressure relieving passageways are located in the cylindrical barrel, wherein a first end of the one or more pressure relieving passageways is located in the cylindrical barrel and in fluid communication with the pressure of the extruder screw, wherein a second end of the one or more pressure relieving passageways is located upstream of the extruder screw.

Definitions

Hopper—typically a cone-shaped slab feed "chute" which attaches to the top of an extruder feedbox. The feed hopper establishes folds in the compound slab feeding into the extruder.

Feedbox—that area of an extruder, where the screw is exposed to accept a rubber slab feed. Typical cold feed extruders have a driven feed roll assembly which forms a pinch area with the screw flights and serves to pull slab compound through the feed hopper and fill the screw flights. The feed roll assembly is usually a hinged assembly, which can be opened for cleaning and greater maintenance access to the screw and feedbox.

Cold Feed Extruder—a piece of machinery for processing visco-elastic materials, including rubber. This machine accepts cold compound in slab form, warms the compound and moves the compound from the feedbox to the end of the barrel, by means of a rotating mechanical screw.

BRIEF DESCRIPTION OF THE DRAWINGS

The invention will be described by way of example and with reference to the accompanying drawings in which.

DETAILED DESCRIPTION OF THE INVENTION

Figure 2:
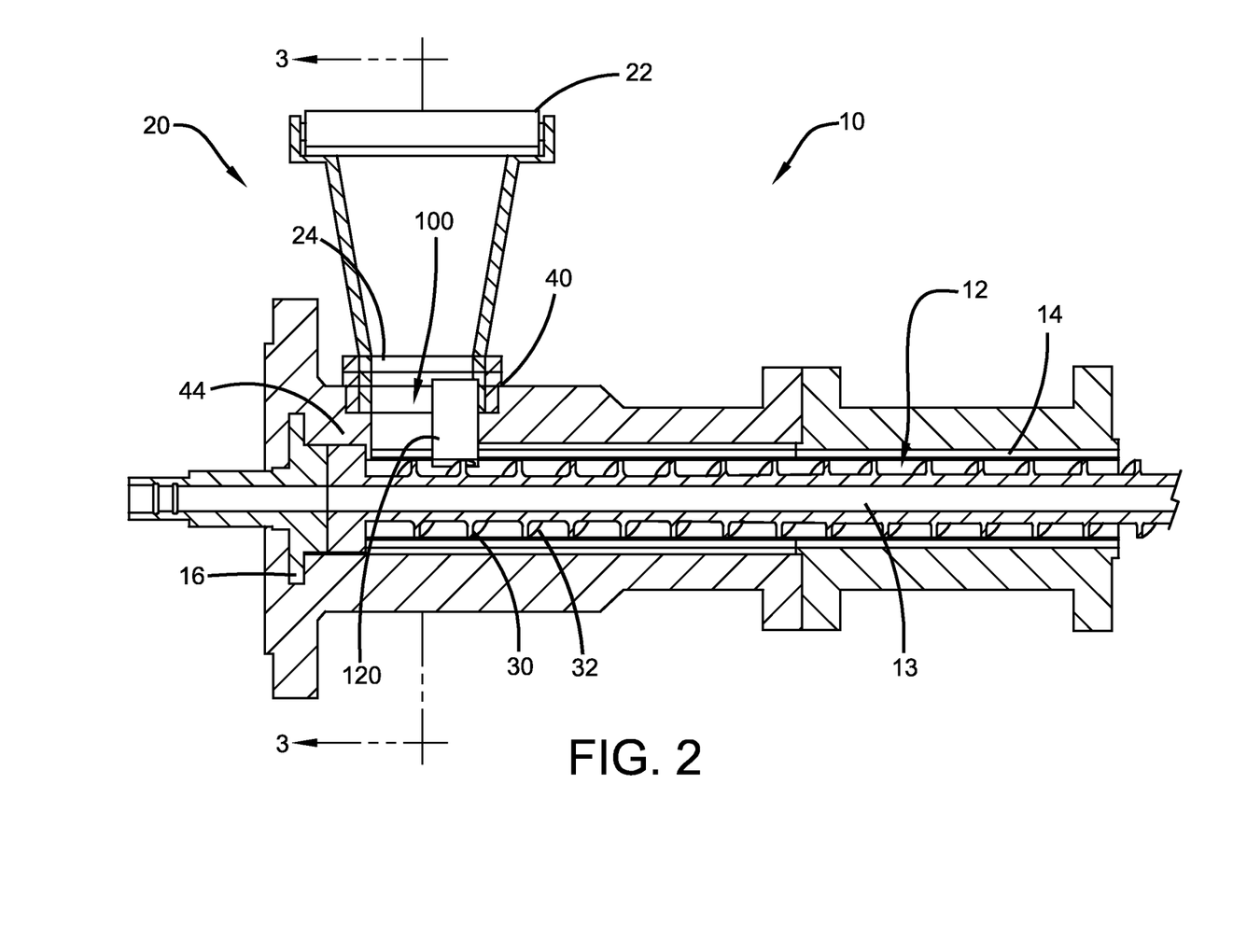
FIG. 2 is a cross-sectional view of an improved feed hopper and screw assembly.
Figure 3:
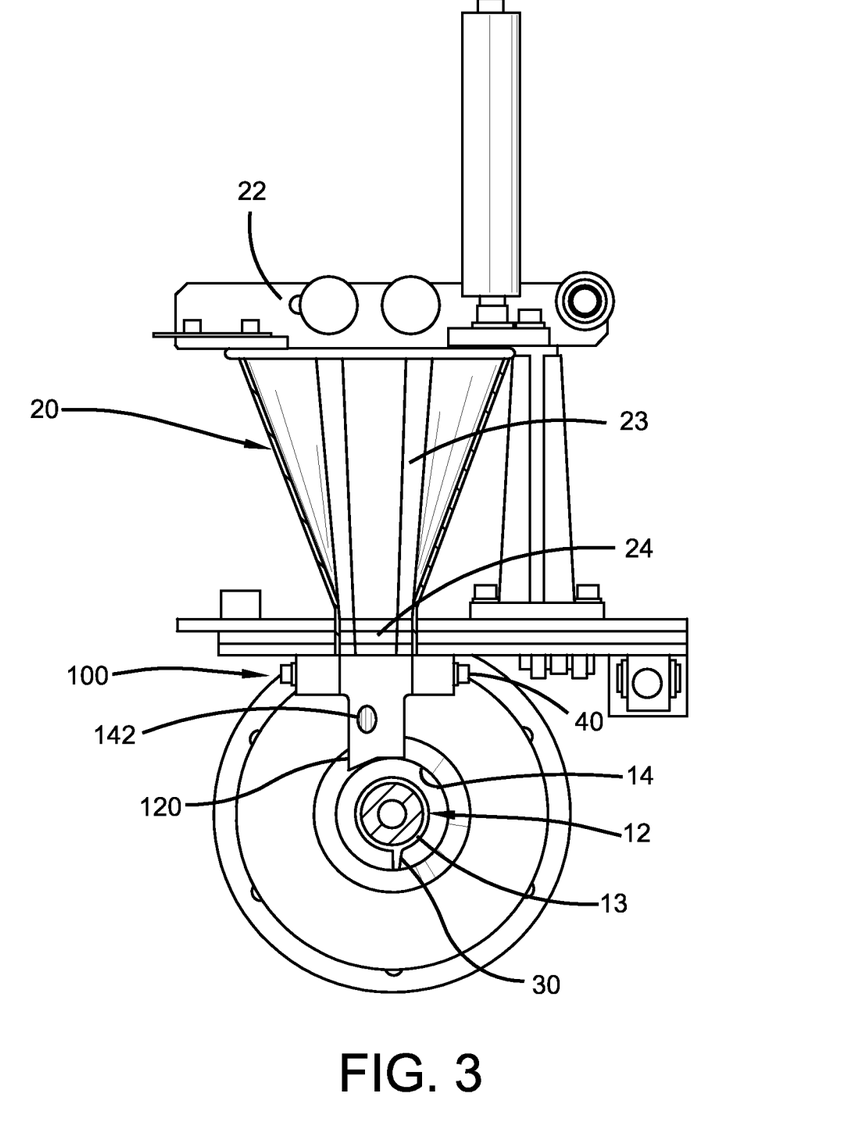
FIG. 3 is a cross-sectional view of an improved feed hopper and screw assembly in the direction 3-3 of FIG. 2.
Figure 4:
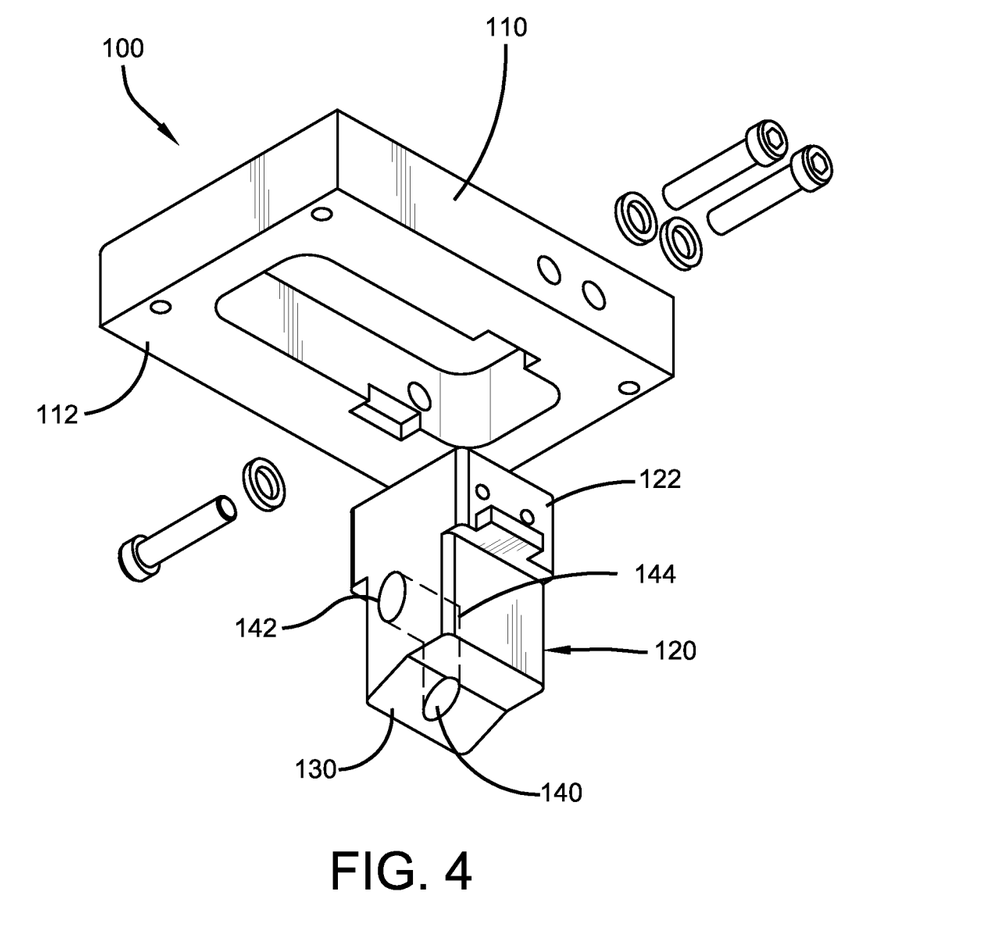
FIG. 4 is an exploded view of a pressure relief assembly of the present invention.
Figure 5:
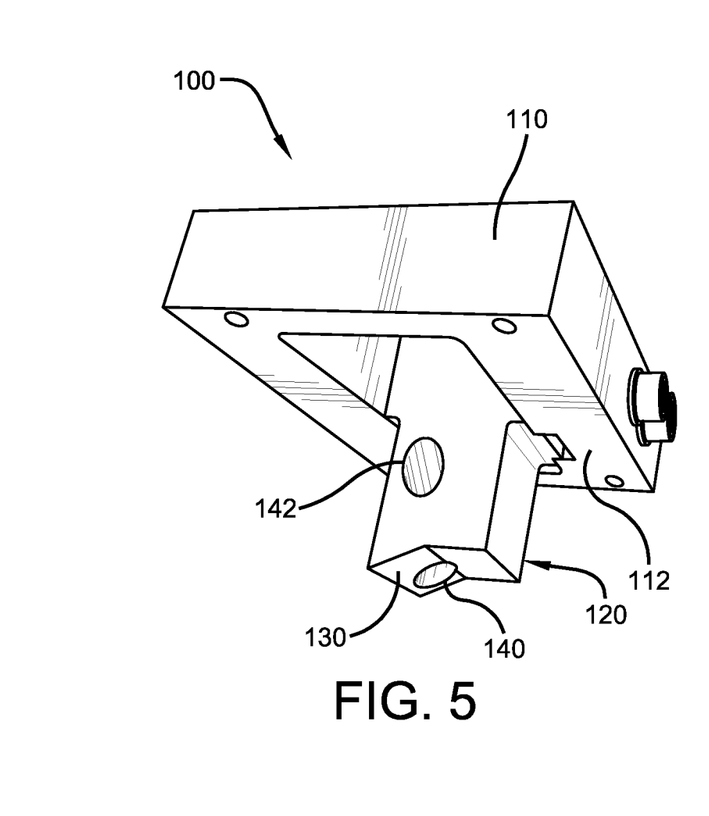
FIG. 5 is a side view of the pressure relief assembly of FIG. 4.
Figure 6:
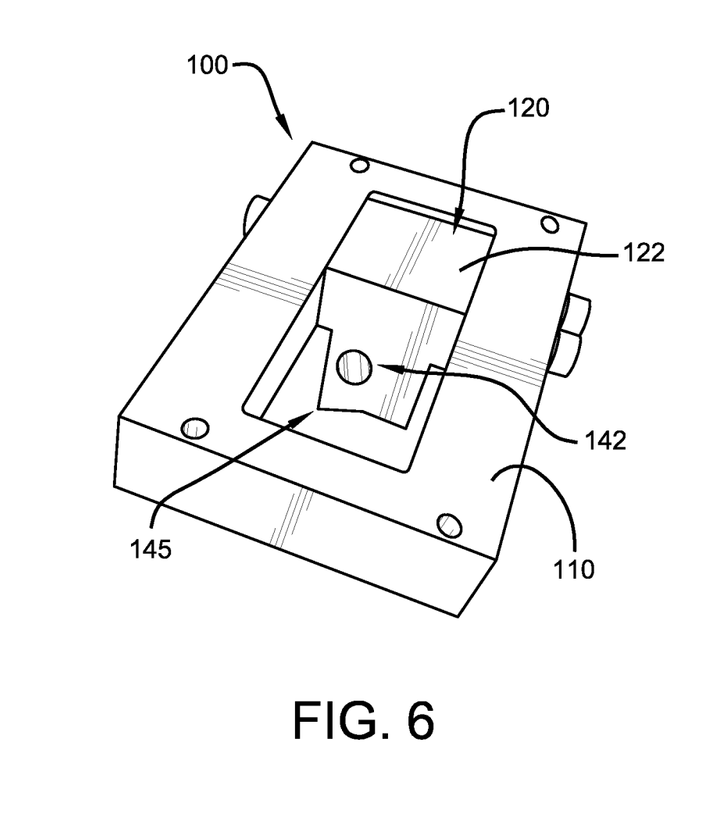
FIG. 6 is a top perspective view of the pressure relief assembly of FIG. 4.

FIG. 2 illustrates an extruder assembly of the present invention shown generally at 10 which includes a feed hopper shown generally at 20 for feeding rubber stock to an extruder screw 12. The extruder screw 12 is mounted in a cylindrical barrel 14. The extruder screw 12 is rotatably mounted in the cylindrical barrel 14 and is suitably journaled in a bushing 16 in the hopper 20. The extruder screw 12 is typically rotated by power means such as a motor and gearbox (not shown). The extruder screw 12 has an elongate cylindrical body 13 having at least two helical screw flights 30,32 mounted thereon. The cylindrical barrel has an outlet end that together with the extruder screw and die may be used to form a rubber component of visco-elastic material, such as rubber.

The cylindrical barrel 14 has an inlet 40 at a feedbox 44 of the extruder screw. The barrel inlet is connected to the outlet end or throat 24 of the feed hopper 20. The hopper 20 has a large inlet end 22 with angled sidewalls 23 which form a cross-sectional area that decreases from the inlet end 22 to the throat 24. The throat 24 is typically rectangular in shape and is generally quite wide to permit ready access by an operator to the cylinder barrel and extruder screw.

The hopper throat 24 is mounted to an upper end of a support frame 110 of a pressure relief assembly 100 of the present invention. The cross-sectional shape of the support frame is preferably rectangular or shaped to mate with the cross-sectional shape of the throat. The lower end 112 of the support frame 110 is mounted to the inlet 40 of the cylindrical barrel. Alternatively, the pressure relief assembly 100 can be integrally formed with the hopper. The pressure relief assembly 100 further includes a pressure reducer insert 120 that has an upper end 122 that forms a flush surface with the support frame 110. The pressure reducer insert 120 is preferably removably mounted in the support frame for ease of service. When the pressure reducer insert 120 is mounted in the support frame, a reduced throat opening 145 is formed in the hopper. The pressure reducer insert 120 further includes a curved lower end 130 that extends downstream and is mounted adjacent the extruder screw 12. The lower end 130 of the pressure reducer insert has an internal fluid passageway 144. The internal fluid passageway 144 is approximately 90 degrees, and has an inlet opening 140 that is positioned in the cylindrical barrel adjacent the screw. The internal fluid passageway has an outlet 142 located upstream of the lower end 130. The outlet 142 of the fluid passageway preferably has a diameter in the range of 3-25 mm, more preferably in the range of about 5-15 mm (about means+/−10%). Alternatively, the cross-sectional area of the fluid passageway may range from about 7-490 square mm$^2$. The internal fluid passageway functions to reduce the pressure differential between the throat and the screw, and also to redirect the regurgitated rubber flow upstream of the screw to refeed. In addition, the size of the refed rubber is controlled by regulating the cross-sectional area of the fluid passageway.

Figure 7:
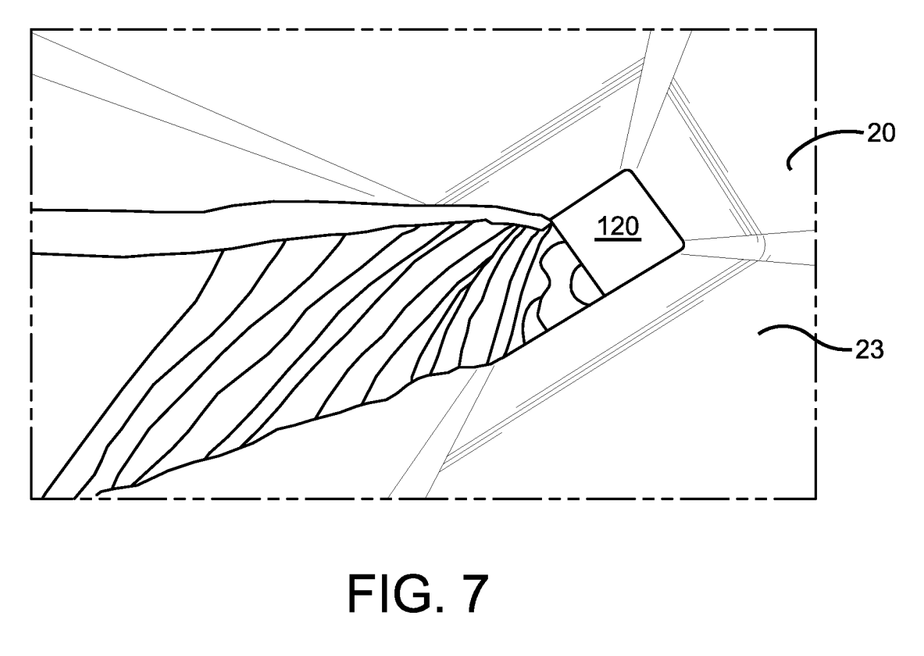
FIG. 7 is a view looking down into the hopper illustrating the regurgitated rubber being refed into the upstream section.
Figure 8:
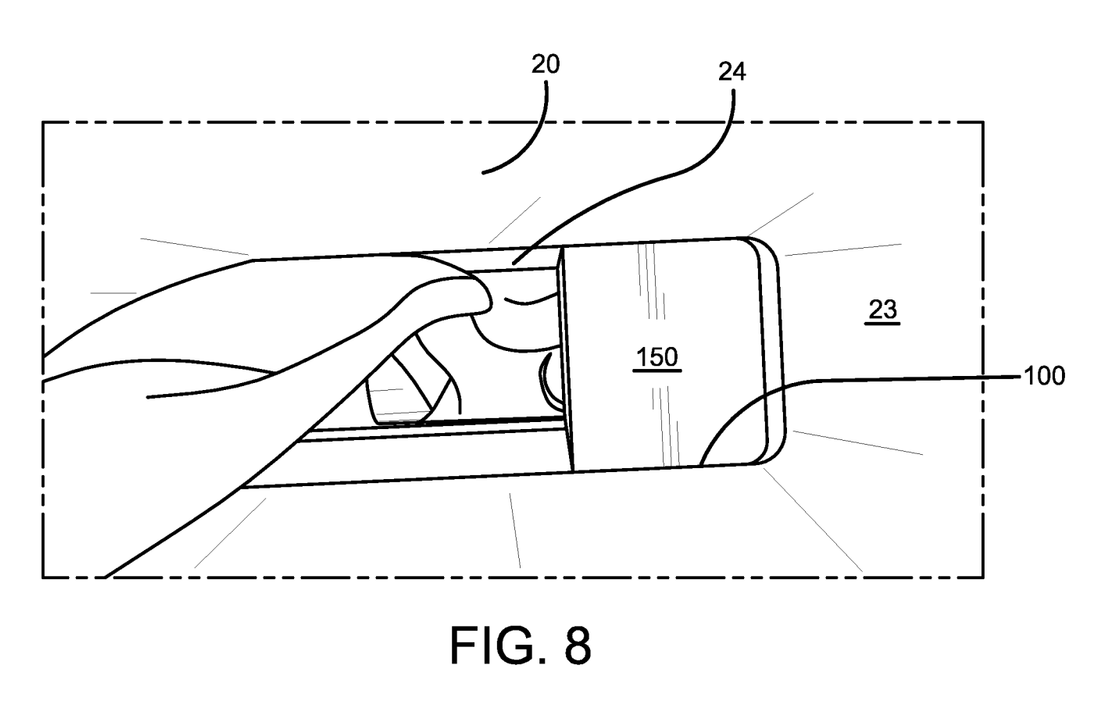
FIG. 8 is a view looking down into the hopper illustrating yellow stock being fed into a hopper wherein the regurgitated blue colored rubber is refed into the upstream section.

FIGS. 7 and 8 illustrate that by utilizing the inventive pressure relief assembly, the slab feed is directed towards one side of the hopper away from the rolling ball of rubber, avoiding interference. Furthermore, because the pressure differential is reduced, the size of the rolling ball is also reduced as well as reducing bite off.

Figure 9:
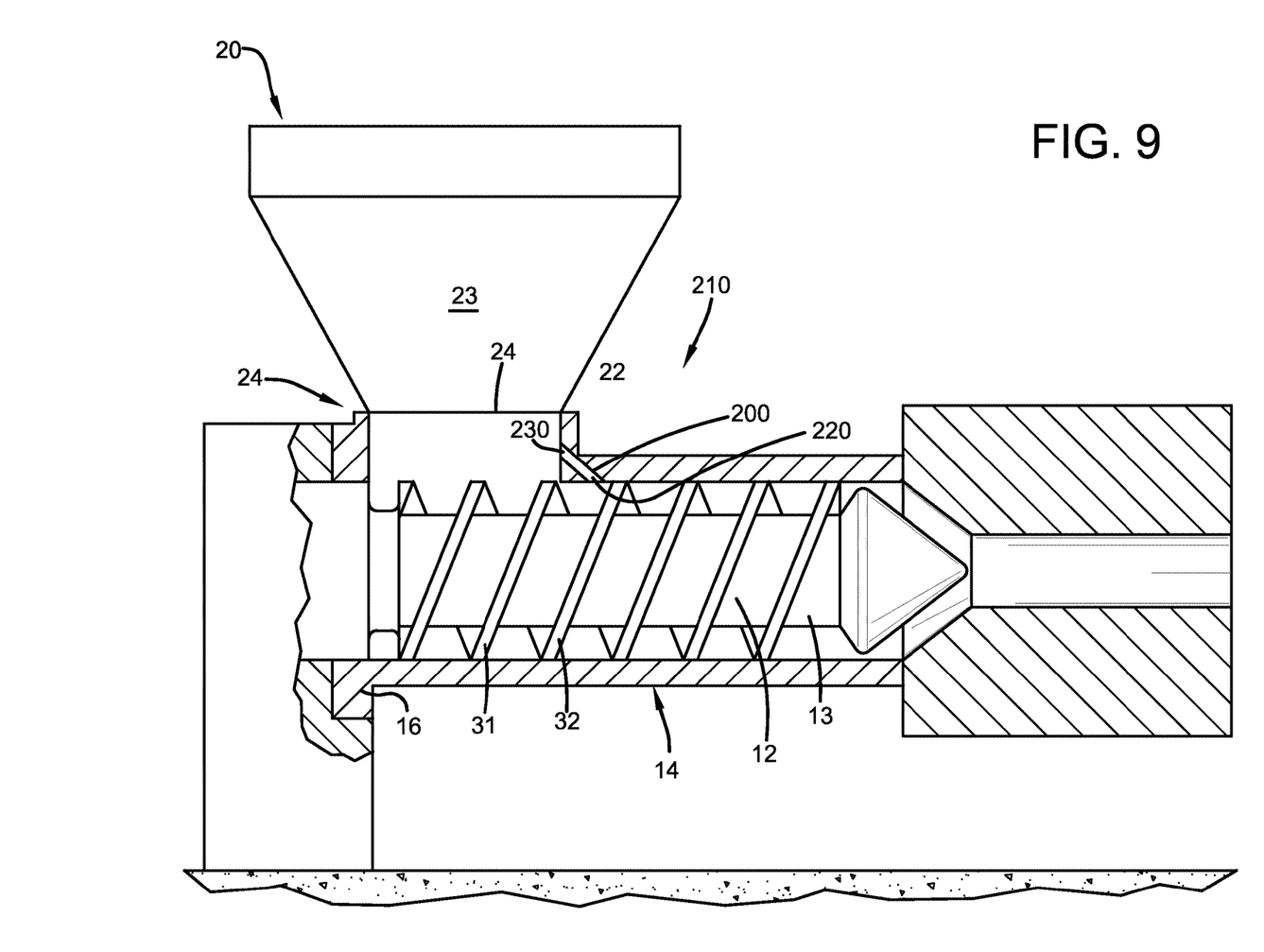
FIG. 9 is an alternate embodiment of an extruder system of the present invention.

An alternate embodiment of the invention is shown in FIG. 9. The extruder system is the same as described above, except for the following differences. The pressure relief assembly 100 is not utilized. Instead, one or more pressure relief passages 200 are provided in the modified extruder system 210. The one or more pressure relief passages 200 have a first hole 220 located adjacent the screw for fluid communication with the screw. The first hole 220 may be located in the cylindrical barrel 14. The one or more pressure relief passages have a second hole 230 located upstream of the first hole 220 and upstream of the extruder screw 12. The second hole 230 is preferably located in the throat of the hopper 24 or in the general region of the throat. The inventors have found by experimentation that by using either a pressure relief passage, they were able to reduce the size of the rolling ball. They found that a large pressure differential between the throat of the hopper and the pressure in the extruder screw barrel results in a large rolling ball which tends to cause bite off. By bleeding off or reducing the large pressure differential, they were able to reduce the size of the rolling ball and reduce bite off.

While certain representative embodiments have been shown for the purpose of illustrating the invention, it will be apparent to those skilled in the art that various changes and modifications can be made without departing from the scope of the invention.

What is claimed is:

1. An extruder apparatus comprising:
   a cylindrical barrel having an inlet end and an outlet end;
   an extruder screw mounted in the cylindrical barrel; said screw having an outer surface having one or more helical flights mounted thereon;
   wherein the inlet end of the cylindrical barrel has a support frame mounted thereto, wherein an upper surface of the support frame is connected to a throat of a hopper; and
   wherein an insert is mounted to the support frame and has a lower end which extends down into the cylindrical barrel, wherein the insert has an internal passageway having a first opening on the lower end and a second opening.

2. The extruder apparatus of claim 1 wherein an upper surface of the insert is flush with an upper surface of the support frame.

3. The extruder apparatus of claim 1 wherein the lower surface of the insert is positioned next to the extruder screw.

4. The extruder apparatus of claim 1 wherein the lower surface of the insert is curved.

5. The extruder apparatus of claim 1 wherein the second opening is located downstream of the support frame.

6. The extruder apparatus of claim 1 wherein the second opening is located downstream of the throat.

7. The extruder apparatus of claim 1 wherein an opening is formed in the support frame adjacent the insert, wherein the opening is the minimum cross-sectional area of the hopper.

* * * * *